United States Patent Office 3,236,592
Patented Feb. 22, 1966

3,236,592
PROCESS FOR THE PRODUCTION OF ALKALI METAL DIIMIDOTRIPHOSPHATES
Morris L. Nielsen, Dayton, Ohio, assignor to Monsanto Company, a corporation of Delaware
No Drawing. Filed July 24, 1961, Ser. No. 125,946
4 Claims. (Cl. 23—106)

The present invention relates to a new process for the manufacture of alkali diimidotriphosphates, such as sodium diimidotriphosphate. The invention relates also to detergent compositions including the said sodium diimidotriphosphate as a detergent builder and sequestrant.

Methods have been described in the prior art for the production of sodium diimidotriphosphate, but such methods have resulted in very high losses in the three or four-step process which are characterized by uncontrollable side reactions and by the production of impure materials.

The present invention includes the various alkali and mixed alkali products and starting materials based upon lithium, sodium, potassium, rubidium and cesium. It has now been found that by conducting a reaction between an alkali phosphoramidate and alkali phosphorodiamidate such as disodium phosphoramidate and sodium phosphorodiamidate, a very high yield of the desired alkali compound such as sodium diimidotriphosphate may be obtained. It has been found essential that the reaction of the said disodium phosphoramidate and sodium phosphorodiamidate be carried out at a temperature of from 100° C. to 300° C., preferably 100–250° C. The proportions of the starting materials are critical and may be used in accordance with the equation below.

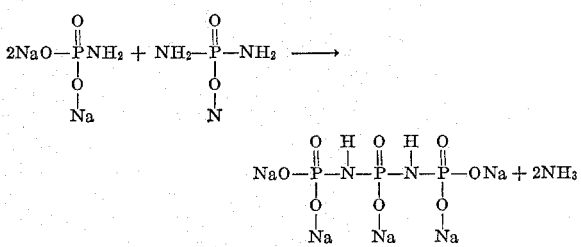

The reaction time of the present process is not critical and may vary from one to twenty-four hours. This represents a considerable improvement over the three or four day time period required for the prior art process.

A further embodiment of the invention is the improvement of carrying out the above-described reaction in the presence of a molten flux as a reaction medium. However, the flux is not essential. The flux may be an alkali organic or inorganic salt such as sodium acetate, sodium formate, and sodium phenoxide.

The proportion of the flux is not critical, and it has been found that variations such as all proportions above 10% by weight of flux relative to the weight of disodium phosphoramidate and sodium phosphorodiamidate may be used. A preferred range is 10 to 1,000% by weight. It has now been found that use of a flux makes it possible for the reaction to be more readily conducted and with a greatly superior reaction rate.

The molten medium or flux which is employed in the present process is composed of the salts which are liquid in the range of from 150° C. to 400° C. A preferred flux for this purpose is potassium formate, while other desirable fluxes are sodium phenoxide, potassium phenoxide, and mixtures thereof in all proportions.

The following examples illustrate specific embodiments of the present invention.

EXAMPLE 1

A mixture of disodium phosphoramidate hexahydrate (18.1 g., 0.072 mole) and sodium phosphorodiamidate hexahydrate (8.2 g., 0.036 mole) was prepared by grinding the same together in a mortar until all passed a 60 mesh sieve. The solids were heated under oil pump vacuum (approximately 1 mm. pressure) at the following schedule: 25° C., 1 hr.; 65° C., 2 hrs.; 95° C., 1 hr.; 125° C., 16 hrs.; 225° C., 24 hrs. The product, consisting of a slightly sintered powder, was shown by nuclear magnetic analysis to consist of about 40% sodium diimidotriphosphate. The calcium sequestration number of the crude product was found by test to be 5 g. $CaCO_3$ per 100 g. product. Purification of the product by fractional crystallization resulted in essentially pure sodium diimidotriphosphate decahydrate as shown by nuclear magnetic resonance.

EXAMPLE 2

The method employed in determining the calcium sequestration properties was as follows.

The procedure is based on the fact that the oxalate ion will not precipitate calcium from the calcium sequestrant complex in alkaline solution (over pH 10). The sequestering agent is titrated with a standard calcium solution in the presence of oxalate indicator when the sequestering agent is completely complexed, a slight excess of calcium will precipitate as calcium oxalate indicating that the end point has been reached. If the sequestrant solution is too dilute, the end point is delayed.

*Determination of sequestering effectiveness*

(1) A sample (5–20 grams) of the sequestering agent is weighed accurately to 0.01 g. and made up to 500 ml. with distilled water in a volumetric flask.
(2) Pipette 3–100 ml. aliquots of this solution into 3–250 ml. beakers.
(3) Pipette 10 ml. of 5.0% ammonium oxalate indicator into each aliquot.
(4) The pH value of the aliquot is determined with the Beckman pH meter. The pH value is adjusted to exactly 11.0 with dilute sodium hydroxide. All aliquots must be adjusted to the same pH value.
(5) Fill a 10 ml. burette with the standard 0.50 M calcium chloride solution. Titrate the aliquots with calcium chloride solution until a faint permanent turbidity is observed, which is the end point. The end point can be more easily detected if the beaker is placed on a black background. Record mls. of standard calcium chloride used to the nearest 0.01 ml. It is suggested that the first aliquot be titrated to give the approximate end point, and then the other 2 aliquots titrated carefully to give the exact end point.
(6) A blank is run using distilled water and the indicator. The blank is subtracted from the sample titrations.

It has been found that detergent formulations of unusual efficiency, particularly liquid detergent concentrates, may be formulated with the alkali diimidotriphosphates and in particular the sodium diimidotriphosphate as an essential constituent. Both wet and dry detergent compositions may be formulated with the alkali diimidotriphosphate. The said alkali diimidotriphosphates may be present accordingly as dry salts in conventional dry detergent formulations and also in high concentration liquid detergent concentrates. It has been found that development of automatic detergent apparatus such as dishwashing machines, clothes washing machines, etc., requires the use of a very high concentration of the active components when such liquid concentrates are to be fed by automatic proportioning machines into the washing apparatus. It is therefore a particular advantage of the present alkali diimidotriphosphates that they are characterized by unusually high solubility in water so that they may be present as components of the active solutions in high concentration.

The alkali diimidotriphosphates have been found to act as sequestrants and also as alkaline builders in the detergent formulation. The said alkali diimidotriphosphates have been found therefore to suppress the precipitation of calcium soaps, i.e., the formation of soap scum and also to provide a buffered or controlled proportion of alkali which enables the conventional active organic components to operate at maximum efficiency.

EXAMPLE 3

A representative detergent formulation based upon the use of sodium diimidotriphosphate was prepared with the following components:

| | Percent |
|---|---|
| Sodium salt of dodecylbenzene sulfonic acid | 35 |
| Sodium carbonate | 5 |
| Sodium sulfate | 13.5 |
| Sodium diimidotriphosphate | 40 |
| Sodium metasilicate | 5 |
| Carboxymethylcellulose | 1.5 |

The above formulation was tested as a detergent composition and found to be effective in removing various types of soil.

The sequestering action of sodium diimidotriphosphate is shown by the following data, determined by the above procedure:

COMPARISON OF SOLUBILITY AND CALCIUM SEQUESTRATION

| | Solubility | Ca Sequestration | |
|---|---|---|---|
| | G./100 ml. water at 25° (as 10 $H_2O$ salt) | Per 100 g. as 10 $H_2O$ salt | Per 100 g. satd. soln. |
| Sodium tripolyphosphate | 12.5 | 7.5 | 0.83 |
| Sodium diimidotriphosphate | 22.7 | 8.8 | 1.62 |

It is seen from the above data that per 100 g. saturated solution in water at 25°C., sodium diimidotriphosphate will sequester two times as much calcium as sodium tripolyphosphate.

EXAMPLE 4

The above detergent formulation was also prepared with potassium diimidotriphosphate; similar tests were also made to determine the solubility and calcium sequestration ability which again proved to be superior to conventional sodium tripolyphosphate.

What is claimed is:

1. Process for the preparation of sodium diimidotriphosphate comprises heating disodium phosphoramidate and sodium phosphorodiamidate together with a molten salt at a temperature in the range of from 100°C. to 300°C.

2. Process for the preparation of sodium diimidotriphosphate which comprises heating disodium phosphoramidate and sodium phosphorodiamidate together with a molten salt at a temperature in the range of from 100°C. to 300°C., the said salt being liquid in the temperature range of from 150°C. to 400°C.

3. Process for the preparation of sodium diimidotriphosphate which comprises heating disodium phosphoramidate and sodium phosphorodiamidate in the presence of potassium phenoxide as a flux at a temperature in the range of from 100°C. to 300°C.

4. Process for the preparation of sodium diimidotriphosphate which comprises heating disodium phosphoramidate and sodium phosphorodiamidate in the presence of potassium formate as a flux at a temperature in the range of from 100°C. to 300° C.

References Cited by the Examiner

UNITED STATES PATENTS

| 1,972,032 | 8/1934 | Reimann | 23—106 |
| 2,174,614 | 10/1939 | Bornemann et al. | 23—106 |
| 2,906,601 | 9/1959 | Koster et al. | 23—106 |
| 2,995,523 | 8/1961 | Germann | 252—137 |
| 3,018,165 | 1/1962 | Nielsen | 23—106 |
| 3,023,168 | 2/1962 | Doan | 252—137 |

OTHER REFERENCES

Klement et al., "Die Darstellung Von Imido diphosphat und Nitrido-tri-phosphate," Z. Anorg, u. Allgem. Chem. 283, 246–56 (1956).

Mellor, "Comprehensive Treatise on Inorganic and Theoretical Chemistry" Vol. 8, pp. 704–707, 712–715, Longmans, Green and Co., 1928, N.Y., London.

MAURICE A. BRINDISI, *Primary Examiner.*

JULIUS GREENWALD, *Examiner.*

UNITED STATES PATENT OFFICE
CERTIFICATE OF CORRECTION

Patent No. 3,236,592                      February 22, 1966

Morris L. Nielsen

It is hereby certified that error appears in the above numbered patent requiring correction and that the said Letters Patent should read as corrected below.

Column 1, lines 35 to 40, the formula should appear as shown below instead of as in the patent:

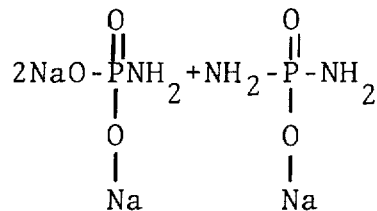

Signed and sealed this 24th day of September 1968.

(SEAL)
Attest:

Edward M. Fletcher, Jr.                      EDWARD J. BRENNER

Attesting Officer                            Commissioner of Patents